United States Patent [19]

Loucks

[11] 4,446,278

[45] May 1, 1984

[54] POLYPHENYLENE OXIDE BLENDS

[75] Inventor: George R. Loucks, Scotia, N.Y.

[73] Assignee: General Electric Company, Schenectady, N.Y.

[21] Appl. No.: 493,862

[22] Filed: May 12, 1983

Related U.S. Application Data

[63] Continuation of Ser. No. 440,908, Nov. 12, 1982, abandoned, which is a continuation of Ser. No. 264,484, May 18, 1981, abandoned.

[51] Int. Cl.³ .............................................. C08L 53/00
[52] U.S. Cl. ........................................ 525/92; 525/67; 525/68; 525/93; 525/146; 525/147; 525/394; 525/905
[58] Field of Search ................. 525/146, 147, 394, 67, 525/68, 92, 93, 905

[56] References Cited

U.S. PATENT DOCUMENTS

| | | | |
|---|---|---|---|
| 3,383,435 | 5/1968 | Cizek | 525/391 |
| 3,875,256 | 4/1975 | White | 525/394 |
| 4,172,103 | 10/1979 | Serini et al. | 525/76 |
| 4,234,706 | 11/1980 | White | 525/394 |
| 4,377,662 | 3/1983 | Loucks | 525/394 |

*Primary Examiner*—J. Ziegler
*Attorney, Agent, or Firm*—William H. Pittman; James C. Davis, Jr.; James Magee, Jr.

[57] ABSTRACT

A new class of polymer blends comprising (I) block copolymers of polyphenylene oxides and sterically-hindered aromatic polycarbonates and (II) vinyl aromatic resins.

9 Claims, No Drawings

POLYPHENYLENE OXIDE BLENDS

CROSS REFERENCE TO RELATED APPLICATIONS

This application is a continuation of copending application Ser. No. 440,908, filed Nov. 12, 1982 which in turn is a continuation of application Ser. No. 264,484, filed May 18, 1981, both now abandoned.

This invention is related to U.S. Pat. No. 4,377,662, the disclosure of which is incorporated herein in its entirety by reference.

BACKGROUND OF THE INVENTION

1. Field of the Invention

This invention relates to novel polymer blends that contain (I) block copolymers of polyphenylene oxides and sterically-hindered aromatic polycarbonates and (II) vinyl aromatic resins. These polymer blends have enhanced physical and/or chemical properties, e.g., enhanced thermal and oxidative product stability. These novel polymer blends can be molded, calendered or extruded as films, sheets, fibers, laminates or other useful articles of manufacture.

2. Description of the Prior Art

Polyphenylene oxide, sterically-hindered aromatic polycarbonate and vinyl aromatic resins are well known in the art.

Illustrative polyphenylene oxide resin descriptions are found in Hay's U.S. Pat. No. 3,306,874 and 3,306,875, White's U.S. Pat. Nos. 4,140,675 and 4,234,706, among others.

Various combinations of polyphenylene oxide resins and vinyl aromatic resins are known such as Cizek's U.S. Pat. No. 3,308,435, Lee's U.S. Pat. Nos. 4,166,055 and 4,166,812, Cooper et al.'s U.S. Pat. No. 4,164,493, Lee's U.S. Pat. No. 4,166,188 and Haaf's U.S. Pat. No. 4,189,411.

Sterically-hindered aromatic polycarbonate resin descriptions are found in Great Britain (General Electric) Pat. No. 1,222,003, Serini et al.'s U.S. Pat. Nos. 3,879,347 and 3,879,348, among others.

Blends of sterically-hindered aromatic polycarbonate and vinyl aromatic resins are described in Serini's U.S. Pat. No. 4,172,103.

Heretofore, polymer blends containing (I) block copolymers of polyphenylene oxides and sterically-hindered aromatic polycarbonates and (II) vinyl aromatic resins have not been reported.

The benefits associated with the compositions of this invention include (1) enhanced oxidative stability, (2) enhanced ultraviolet light stability and (3) improved processing characteristics.

DESCRIPTION OF THE INVENTION

This invention embodies novel blends of (1) block copolymers of polyphenylene oxides and sterically-hindered aromatic polycarbonates and (2) vinyl aromatic resins.

In general, the block copolymers of polyphenylene oxides and sterically-hindered aromatic polycarbonates (hereinafter also referred to as "SH-aromatic-PC") include those described, among others, by the following model structures:

$AZ(CZ)_x$, $AZ(CZ)_xA$, $AZ(CZ)_xB$, $BZ(CZ)_xB$,
$AZ(CZ)_xBZ(CZ)_xA$, $AZ(CZ)_xBZ(CZ)_x(CZ)_xB$,
$AZBZ(CZ)_xBZ(CZ)_xBZA$ etc., etc., etc.

wherein x is a number of at least 1, often from 10 to 200 and higher, preferably from 30 to 100 and frequently from 40 to 70.

The mono- and polyfunctional polyphenylene oxides, as well as the SH-aromatic-PC reactants—including the process of preparing random and/or alternating polymer segments defined by the A, B, $(CZ)_x$, and Z units of the above model structure are described in greater detail in the aforementioned U.S. Pat. No. 4,377,662.

In a preferred embodiment of this invention the block copolymers of polyphenylene oxides and sterically-hindered aromatic polycarbonates contain monofunctional polyphenylene oxide resin segments illustrated by formula (I) set out hereafter:

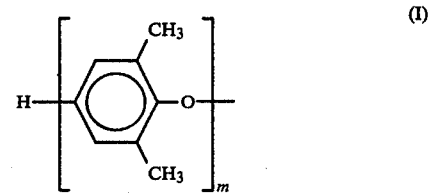

where m is a number of at least 10, and more preferably 40 to 70. These monofunctional polyphenylene oxide segments of the block copolymers are abbreviated in the above model structures by the unit A.

In another preferred embodiment of this invention the block copolymers of polyphenylene oxides and sterically-hindered aromatic polycarbonates contain polyfunctional polyphenylene oxide resin segments illustrated by formula (II) set out hereafter:

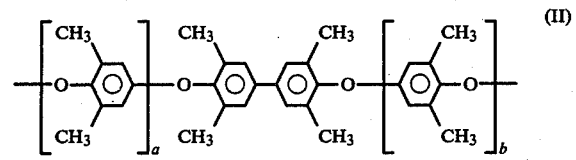

where either a or b is at least equal to 1, the sum of a plus b is preferably at least equal to 10, more preferably 40 to 170. The polyfunctional polyphenylene oxide segments of the block copolymers are abbreviated in the above model structures by the unit B.

Presently preferred block copolymer sterically-hindered aromatic polycarbonate segments are illustrated by the formulas (III) and (IV) set out hereafter:

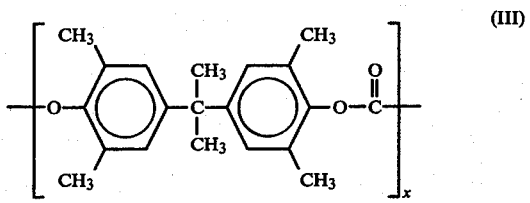

or

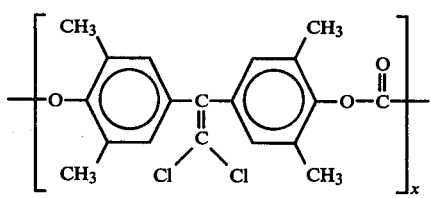

(IV)

where x is a number at least equal to 10, preferably from 20 to 200, or even higher, and often more preferably from 30 to 50. The sterically-hindered-aromatic polycarbonate segments of the block polymers are abbreviated in the above model structures by the unit $(CZ)_x$ wherein x is as previously defined.

Coupling of polyphenylene oxide segments and sterically-hindered aromatic polycarbonate segments by a

carbonyl radical is abbreviated by the unit —Z—.

As used herein and in the appended claims, the term "vinyl aromatic resin" includes any "styrenic" polymers derived from compounds having at least a portion of and, preferably at least 25% of—their units derived from a monomer having the formula:

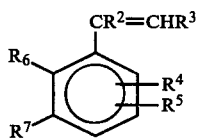

(V)

wherein $R^2$ and $R^3$ are selected from the group consisting of lower alkyl or alkenyl groups of from 1 to 6 carbon atoms and hydrogen; $R^4$ and $R^5$ are selected from the group consisting of chloro, bromo, hydrogen and lower alkyl of from 1 to 6 carbon atoms; $R^6$ and $R^7$ are selected from the group consisting of hydrogen and lower alkyl and alkenyl groups from 1 to 6 carbons or $R^6$ and $R^7$ may be connected together with hydrocarbonyl groups to form a naphthyl group.

Included in the scope of vinyl aromatic resins are copolymers of the aromatic monomer of formula (V) and those having their units derived from "olefinic" monomers having the formula:

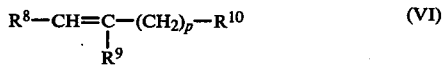

(VI)

wherein $R^8$ and $R^9$ represent a substituent selected from the group consisting of hydrogen, halogen, an alkyl group of 1–4 carbon atoms, carboalkoxy or $R^8$ and $R^9$ taken together represent an anhydric linkage (—COOOC—) and $R^{10}$ is hydrogen, vinyl, an alkyl or alkenyl group having 1 to 12 carbon atoms, cycloalkyl, carboalkoxy, alkoxy-alkyl carboxy, ketoxy, halogen, carboxy, cyano or pyridyl and p is a whole number between 0 and 9.

The general expression vinyl aromatic resin set forth herein includes, by way of example, homopolymers such as polystyrene and polymonochlorostyrene, etc., the modified polystyrenes, such as rubber-modified, high-impact polystyrene, etc., the styrene containing copolymers, such as the styrene acrylonitrile copolymers, styrene-butadiene copolymers, styrene-acylonitrile-alkyl styrene copolymers, styrene-acrylonitrile-butadiene copolymers, poly-α-methylstyrene, copolymers of ethylvinyl benzene, copolymers of α,β-unsaturated cyclic anhydrides including maleic anhydride, citraconic anhydride, itaconic anhydride, acotinic anhydride with styrene such as styrene-maleic anhydride copolymers, etc., graft copolymers, of styrene and styrene-butadiene, etc., divinylbenzene styrene-maleic anhydride copolymers, block copolymers of polystyrene-polybutadiene, polystyrene-polybutadiene-polystyrene, polystyrene-polyisoprene-polystyrene, etc., hydrogenated block copolymers of polystyrene-polybutadiene-polystyrene, etc., radial teleblock copolymers of butadiene and styrene including minor amounts of a coupling agent, hydrogenated radial teleblock copolymers, impact-modified teleblock copolymers such as acrylic-styrene-butadiene terpolymer, modified teleblock polymers, etc.

The rubber modified high-impact polystyrenes may be made with diene rubbers such as butadiene rubber, styrene-butadiene rubber, acrylonitrile rubber or ethylene-propylene copolymers of EPDM rubber.

Blends of polyphenylene oxide and sterically-hindered aromatic polycarbonates (hereinafter also referred to as "PPO-PC block copolymers") and vinyl aromatic resins can be prepared by any means known to those skilled in the art. Preferred blends are prepared by heating admixtures of PPO-PC block copolymers and vinyl aromatic resins to a temperature above their softening point(s). Preferably, the mixing or blending is carried out—when carried out in the absence of a solvent—at the aforesaid elevated temperature, i.e., above their softening point(s), while subjecting the admixture to mechanical working. Accordingly, blends can be mixed with such equipment as extruders including mono- and multiple screw types, internal Banbury mixers, roll mills, or any other mechanical equipment which will subject the admixture to shear stresses at elevated temperatures.

In general, PPO-PC block copolymers and vinyl aromatic resin compositions can contain other ingredients such as reinforcing and nonreinforcing fillers, mold release agents, ultraviolet light stabilizers, antioxidants, drip retarding agents, surfactant agents, etc.

The PPO-PC block copolymers and vinyl aromatic resins are combinable with each other in all proportions. Consequently, compositions comprising from 1 to 99% by weight of PPO-PC block copolymer and from 99 to 1% by weight of vinyl aromatic resin are included within the scope of the invention. By controlling the proportions of PPO-PC block copolymers and vinyl aromatic resin—formulations having predetermined properties which are improved over those of either a PPO-PC block copolymer or a vinyl aromatic resin alone are readily obtained. In general, blends of the PPO-PC block copolymers and vinyl aromatic resins have substantially enhanced color stabilities with respect to ultraviolet light degradation and reduced melt viscosities without significantly lowering heat distortion temperatures generally associated with polyphenylene oxide and vinyl aromatic resin blends containing 30–50 parts by weight of polyphenylene oxide and 70–50 parts by weight of vinyl aromatic resin. In general, the copolymer blends of this invention preferably contain 30–50 parts of PPO-PC block copolymer and 70–50 parts of vinyl aromatic resin on a weight basis. The PPO-PC block copolymer components of the blends of this invention preferably contain 5–95 parts of polyphenylene oxide segments and 95–5 parts of sterically-hindered aromatic polycarbonate segments, and even more preferably 5–40 parts of polyphenylene oxide segments and 95–60 parts of sterically-hindered aromatic polycarbonate segments.

The best mode of practicing this invention is set out in the Examples hereafter.

TABLE I

| | REACTION PARAMETERS | | | | | | |
|---|---|---|---|---|---|---|---|
| Run No. | TMBPA (g) | PPO (g) | PPO [η] | TEA (g) | CCCl₂ (g) | H₂O (ml) | CH₂Cl₂ (ml) |
| I | 8.52 | 2.31 | 0.24 | 0.30 | 12.6 | 50 | 45 |
| II | 5.40 | 5.60 | 0.24 | 0.20 | 8.4 | 50 | 45 |
| III | 2.70 | 8.40 | 0.24 | 0.11 | 4.8 | 50 | 45 |
| IV | 8.70 | 2.31 | 0.28 | 0.32 | 12.6 | 45 | 50 |
| V | 2.70 | 8.40 | 0.28 | 0.11 | 4.8 | 50 | 45 |

TABLE II

| | COPOLYMER PROPERTIES | | | | | | | |
|---|---|---|---|---|---|---|---|---|
| Run No. | Yield (g) | % Yield | [η] | Tg (°C.) | Wt. % PPO | $\overline{Mw}$ | $\overline{Mn}$ | $\overline{Mw}/\overline{Mn}$ |
| I | 11.3 | 97.4 | 0.72 | 209 | 20.5 | 83,790 | 30,700 | 2.73 |
| II | 11.1 | 98.8 | 0.62 | 210 | 48.5 | 68,150 | 25,600 | 2.66 |
| III | 10.9 | 97.6 | 0.43 | — | 72.7 | 37,720 | 16,360 | 2.31 |
| IV | 11.4 | 99+ | 0.85 | — | 19.3 | 123,700 | 39,400 | 3.14 |
| V | 10.2 | 91.6 | 0.54 | — | 75.1 | 74,180 | 19,270 | 3.85 |

EXAMPLE 1

A series of block copolymers were generally prepared according to the following detailed procedure with respect to Run No. I, further described in Tables I and II, which also follow:

A 300 ml. 5-neck round-bottom flask equipped with a mechanical stirrer, condenser, pH probe, caustic addition funnel and phosgene inlet tube was charged with 2.31 g. mono-functional polyphenylene oxide—prepared as described in EXAMPLE 1(A) of the aforementioned U.S. Pat. No. 4,377,662, and 45 ml. of methylene chloride. The mixture was stirred and heated to reflux, i.e., approximately 40° C., and 8.52 g. of bis(4-hydroxy-3,5-dimethylphenyl)-propane-2,2, 50 ml. of water, and 0.30 g. of triethylamine were added. The pH of the mixture was adjusted to 13 by the addition of 1.5 ml. of a 50% sodium hydroxide solution. Phosgene was passed through the agitated mixture at 0.21 g. per minute from a calibrated flow meter while adding approximately 12 ml. of a 50% sodium hydroxide solution—during the course of the reaction—in order to maintain a relatively constant pH value of 13. After 60 minutes the phosgene flow was stopped, the flask was purged with nitrogen, and the viscous solution diluted with 50 ml. of chloroform. The organic phase was added to 5 volumes of methanol in a high speed mixing blender. The resulting block copolymer was filtered, washed several times with water and methanol, and dried overnight in vacuo at approximately 60° C. The polymer had an intrinsic viscosity of 0.72 dl./g. measured in chloroform at 25° C. Molecular weight was determined by GPC analysis based on a polystyrene calibration.

A 0.75 g. sample of the resulting block copolymer was compression molded into a disc 1 mm. thick and 2.5 cm. in diameter at 270° C. and 5000 psi in a laboratory press. The disk was transparent.

A film cast from a solution of the block copolymer in chloroform was also transparent and flexible.

A resume of the product reaction parameters and product properties are set out in Tables I and II, respectively, which correspond to a series of runs carried out in a manner analogous to that described in detail above.

The polyphenylene oxide segments of the block copolymers of Run Nos. I–III are essentially mono-functional and were prepared in accordance with Example 1(A) of the aforementioned U.S. Pat. No. 4,377,662 and the polyphenylene oxide components of Run Nos. IV–V are essentially polyfunctional and were prepared in accordance with Example 1(B) thereof.

EXAMPLE 2

A series of block copolymer high impact polystyrene blends were prepared according to the following detailed procedure with respect to Run No. VI further described in Table III.

3.0 g. of high-impact rubber modified polystyrene resin (Foster-Grant "HIPS" resin) was suspended and vigorously agitated in 100 mls. of chloroform in a high speed mixing blender. 2.0 g. of the polyphenylene oxide-polycarbonate block copolymer of Example I Run No. IV was added to the agitated suspension. After the block copolymer was completely dissolved the block copolymer high-impact rubber modified polystyrene resin blend was co-precipitated by addition to approximately 350 mls. of anti-solvent methanol in a high speed mixing blender. The resulting co-precipitated blend of "PPO-TMBPA-PC block copolymer" and high-impact polystyrene ("HIPS") was dried under vacuum overnight at approximately 50°–60° C.

A sample of the resulting blend of polyphenylene oxide polycarbonate block copolymer and high impact polystyrene resin was compression molded into a disk 1/32 inches thick and 1 inch in diameter at 250°–270° C. and 5000 psig in a laboratory press. The appearance of the resulting molded disk was slightly translucent.

A polymer blend $T_g$ test ($T_g$ values determined employing differential scanning calorimetry procedures) was conducted on the molded disk and a single $T_g$ value was observed, indicative that a single-phase solid solution had been formed between the copolymers and polystyrene portion of the HIPS.

A resume of the series of block copolymer/high impact polystyrene blends evaluated including the relative amounts of segmented polyphenylene oxide (PPO) and tetramethyl bisphenol-A polycarbonate (TMBPA-PC) contained in the block copolymer component of the blends, the appearance of the compression molded discs, e.g., transparent, translucent or opaque, as well as the $T_g$ values of the blends is set out in Table III hereafter.

TABLE III

THIS INVENTION-BINARY BLEND PRODUCT PARAMETERS

| Run No. | PPO-TMBPA-PC Block Copolymer Wt. % | ( Relative PPO/PC Wt. % Ratio ) | HIPS Wt. % | Appearance Compression Molded Disc | $T_g$ °C. |
|---|---|---|---|---|---|
| VI | 40 | (19.3:80.7) | 60 | Slightly Translucent | 125 |
| VII | " | (48.5:51.5) | " | Slightly Translucent | 136 |
| VIII | " | (72.7:29.3) | " | Slightly Translucent | 133 |

For contrast purposes, a series of binary and ternary blends containing polyphenylene oxide, tetramethyl-BPA-polycarbonate, and high impact polystyrene resins were combined employing the same co-precipitation techniques described for the blends of this invention described in detail above. The blends contained polyphenylene oxide having an intrinsic viscosity of about 0.55 dl./g. measured in chloroform at 25° C., a tetramethyl bisphenol-A polycarbonate having an intrinsic viscosity of about 0.50 dl./g. measured in chloroform at 25° C., and a rubber modified high-impact polystyrene resin (Foster-Grant's Fostuflex 834 HIPS resin) containing about 10% polybutadiene rubber. This Foster-Grant "HIPS" block copolymer is an A'—B'—A' type in which the terminal A' blocks are thermoplastic homopolymers of styrene, and the center B' block is an elastomeric polymer derived from 1,3-butadiene. Typically the weight-average molecular weight (Mw) of the HIPS resins is about 200,000, and the Mw/Mn ratio is about 7.5. The resulting polymer blends were evaluated in a manner identical to that of the binary blends of this invention and the results are set out in Table IV hereafter.

TABLE IV

NOT THIS INVENTION - BINARY AND TERNARY BLEND PRODUCT PARAMETERS

| Run No. | PPO (Wt. %) | TMBPA-PC (Wt. %) | ( Relative PPO/PC Wt. % Ratio ) | HIPS (Wt. %) | Appearance Compression Molded Disc | $T_g$ °C. |
|---|---|---|---|---|---|---|
| IX | — | 40 | (0:100) | 60 | Translucent | 114,188 |
| X | 10 | 30 | (25:75) | " | " | 115,187 |
| XI | 20 | 20 | (50:50) | " | " | 125,194 |
| XII | 30 | 10 | (75:25) | " | " | 129,192 |
| XIII | 40 | — | (100:0) | " | " | 139, |

As illustrated by the single $T_g$ values obtained as illustrated by Table III where binary blends of this invention are formed, the blends exhibit a single phase solid solution i.e., blends exhibiting complete compatibility whereas ternary blends and binary blends as illustrated by Table IV containing various amounts of individual polymer components polyphenylene oxide, tetramethyl bisphenol-A polycarbonate and rubber modified high impact polystyrene exhibit, based on $T_g$ data, multiple phase solid solutions i.e., binary and ternary blends exhibiting only partial solid solution phase compatibility characteristics.

EXAMPLE 3

A series of block copolymer and homopolymers of polystyrene were blended according to the following detailed procedure with respect to Run No. XIV further described in Table V.

3.0 g. of crystal polystyrene homopolymer (Koppers Co. Inc. Dylene 8G "XPS") and 2.0 g. of the polyphenylene oxide-polycarbonate block copolymer of Example I Run No. IV were dissolved in 50 mls. of chloroform in a high speed mixing blender. The resulting polymer blend was co-precipitated by the addition to approximately 350 mls. of anti-solvent methanol. The resulting co-precipitated blend of "PPO-TMBPA-PC block copolymer" and crystal polystyrene ("XPS") was dried under vacuum for 24 hours at approximately 50°-60° C.

A sample of the resulting blend of polyphenylene oxide polycarbonate block copolymer and polystyrene homopolymer was compression molded into a disk 1/32 inch thick and 1 inch in diameter at 250°-270° C. and 5000 psig in a laboratory press. The appearance of the resulting molded disk was transparent.

A polymer blend $T_g$ test ($T_g$ values determined employing differential scanning colorimetry procedures) was conducted on the molded disk and a single $T_g$ value was observed, indicative that a single-phase solid solution had been formed.

A resume of the series of block copolymer/crystal polystyrene blends evaluated including the relative amounts of segmented polyphenylene oxide (PPO) and tetramethyl bisphenol-A polycarbonate (TMBPA-PC) contained in the block copolymer component of the blends, the appearance of the compression molded discs, e.g., transparent, translucent or opaque, as well as the $T_g$ values of the blends is set out in Table V hereafter.

TABLE V

THIS INVENTION - BINARY BLEND PRODUCT PARAMETERS

| Run No. | PPO-TMBPA-PC Block Copolymer Wt. % | Relative PPO/PC Wt. % Ratio | XPS Wt. % | Appearance Compression Molded Disc | Tg °C. |
|---|---|---|---|---|---|
| XIV | 40 | (19.3:80.7) | 60 | Transparent | 126 |
| XV | " | (48.5:51.5) | " | " | 132 |
| XVI | " | (72.7:29.3) | " | " | 130 |

For contrast purposes, a series of binary and ternary blends containing polyphenylene oxide, tetramethyl-BPA-polycarbonate, and crystal polystyrene homopolymers were combined employing the same co-precipitation techniques described for the blends of this invention described in detail above. The blends contained polyphenylene oxide having an intrinsic viscosity of about 0.55 dl./g. measured in chloroform at 25° C., a tetramethyl bisphenol-A polycarbonate having an intrinsic viscosity of about 0.50 dl./g. measured in chloroform at 25° C., and a crystal polystyrene homopolymer (Koppers Co. Inc., Dylene 8G "XPS"). Typically the weight-average molecular weight of the "XPS" is about 395,000 and the Mw/Mn ratio is about 4.1. The resulting polymer blends were evaluated in a manner identical to that of the binary blends of this invention and the results are set out in Table VI hereafter.

TABLE VI

NOT THIS INVENTION - BINARY AND TERNARY BLEND PRODUCT PARAMETERS

| Run No. | PPO (Wt. %) | TMBPA-PC (Wt. %) | Relative PPO/PC Wt. % Ratio | XPS (Wt. %) | Appearance Compression Molded Disc | Tg °C. |
|---|---|---|---|---|---|---|
| XVII | — | 40 | (0:100) | 60 | Translucent | 114,186 |
| XVIII | 10 | 30 | (25:75) | " | " | 114,178 |
| XIX | 20 | 20 | (50:50) | " | " | 122,184 |
| XX | 30 | 10 | (75:25) | " | " | 127 |
| XXI | 40 | — | (100:0) | " | " | 131 |

As illustrated by the single $T_g$ values obtained as illustrated by Table V where binary blends of this invention are formed, the blends exhibit a single phase solid solution i.e., blends exhibiting complete compatibility whereas ternary blends and binary blends as illustrated by Table VI containing various amounts of individual polymer components polyphenylene oxide, tetramethyl bisphenol-A polycarbonate and crystal polystyrene homopolymer exhibit, based on $T_g$ data, variant single-multiple phase solid solutions i.e., binary and ternary blends exhibiting variable solid solution phase compatibility characteristics.

The polymer blends of polyphenylene oxides and sterically-hindered aromatic polycarbonates in combination with vinyl aromatic resins beneficially exhibit enhanced ultraviolet light stability and reduced melt viscosity when contrasted with engineering thermoplastic resin blends containing only polyphenylene oxides resin, i.e. free of sterically-hindered aromatic polycarbonate segments, and vinyl aromatic resins.

Typical properties of the polymer blends of this invention, e.g., which contain 30-50 parts of PPO-PC block copolymer and 70-50 parts of vinyl aromatic resin, on a weight basis, wherein the PPO-PC block copolymer contains approximately equal amounts of polyphenylene oxide segments and sterically-hindered aromatic polycarbonate segments, again on a weight basis, are set out in Table VII hereafter.

TABLE VII

| Property | G.E. Modified ASTM Procedure | Typical Value Range |
|---|---|---|
| Tensile Stength, p.s.i. | | |
| Yield | D638 | 8,000–10,000 |
| Ultimate | D638 | 7,000–8,500 |
| Tensile Elongation, Percent | D638 | 55–70 |
| Ultimate | | |
| Flexural modulus, p.s.i. 73° F. | D790 | 300,000–400,000 |
| Izod Impact Strength, ft. lbs./in., ⅛" bar | D256 | 2.5–4.0 |
| Melt Viscosity, poise 1,500 sec.$^{-1}$ | Instron 282° C. | 1,450–1,750 |
| Heat Distortion Temperature 264 p.s.i. °C. | D648 | 230–240 |

In general the polymer compositions of this invention are well suited for applications requiring excellent electrical insulating properties, good mechanical properties at elevated temperatures and dimensional stability under conditions of high humidity and mechanical load. Illustrative of commercial applications include electrical and electronic applications such as bobbins, tube bases, control shafts, television deflection-yoke components, business machine housings, small appliance housings, automotive fixtures and housings such as dashboard electrical connectors, knobs, handles and cases. The polymer blends are readily painted and metallized, and, accordingly are especially suited to automotive interior fixtures and moldings.

The polymer blends can be molded or extruded as sheets, laminates or other useful articles of manufacture at temperatures of about 400° F. to about 630° F. employing conventional processing equipment for engineering thermoplastic materials including extruders, mono and multiple screw types, mills or other mechanical equipment which subject engineering thermoplastic materials to high sheer stress at elevated temperatures.

I claim:
1. A polymer blend comprising:
   (I) about 1–99 parts by weight of a block copolymer containing

(i) about 5-95 parts by weight of polyphenylene oxide segments having at least one of the formulas

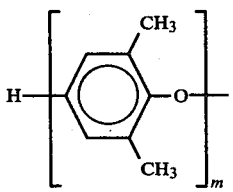

wherein m is at least 10, and

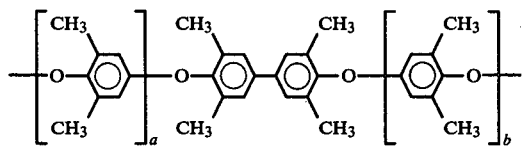

wherein either a or b is at least 1 and a+b is at least 10, and (ii) about 95-5 parts of sterically hindered aromatic polycarbonate segments having at least one of the formulas

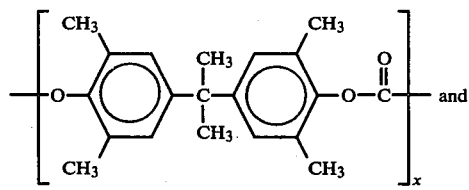

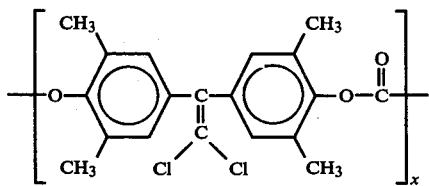

wherein x is at least 30; and (II) about 99-1 parts of a vinyl aromatic resin.

2. The claim 1 polymer blend wherein at least one of m and a+b is 40-170 and x is 30-200.

3. The claim 2 polymer blend wherein the block copolymer contains 30-50 parts of polyphenylene oxide segments and 70-50 parts of polycarbonate segments.

4. The claim 2 polymer blend wherein the block copolymer contains 10-40 parts of polyphenylene oxide segments and 90-60 parts of polycarbonate segments.

5. The claim 1 polymer blend wherein (II) the vinyl aromatic resin is derived from a styrenic monomer of the formula:

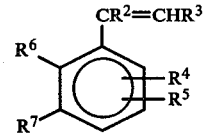

wherein $R^2$ and $R^3$ are selected from the group consisting of lower alkyl or alkenyl groups of from 1 to 6 carbon atoms and hydrogen; $R^4$ and $R^5$ are selected from the group consisting of chloro, bromo, hydrogen and lower alkyl of from 1 to 6 carbon atoms; $R^6$ and $R^7$ are selected from the group consisting of hydrogen and lower alkyl and alkenyl groups from 1 to 6 carbons or $R^6$ and $R^7$ may be connected together with hydrocarbonyl groups to form a naphthyl group.

6. The claim 5 polymer blend where (II) the vinyl aromatic resin is derived from the styrenic monomer and an olefinic monomer of the formula:

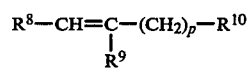

wherein $R^8$ and $R^9$ represent a substituent selected from the group consisting of hydrogen, halogen, an alkyl group of 1-4 carbon atoms, carboalkoxy or $R^8$ and $R^9$ taken together represent an anhydric linkage (—COOOC—) and $R^{10}$ is hydrogen, vinyl, an alkyl or alkenyl group having 1 to 12 carbon atoms, cycloalkyl, carboalkoxy, alkoxy-alkyl carboxy, ketoxy, halogen, carboxy, cyano or pyridyl and p is a whole number between 0 and 9.

7. The claim 6 polymer blend wherein at least 25% by weight of the vinyl aromatic resin is derived from the styrenic monomer.

8. The claim 7 polymer blend wherein the vinyl aromatic resin is a high-impact polystyrene.

9. The claim 7 polymer blend wherein the vinyl aromatic resin is a crystal polystyrene homopolymer.

* * * * *